(12) United States Patent
Zhang et al.

(10) Patent No.: US 12,179,366 B2
(45) Date of Patent: Dec. 31, 2024

(54) METHOD FOR AVOIDING INTERFERENCE OF WELDING EQUIPMENT, AND DEVICE FOR CONTROLLING WELDING EQUIPMENT

(71) Applicant: HONDA MOTOR CO., LTD., Tokyo (JP)

(72) Inventors: Wenhao Zhang, Tochigi (JP); Shinji Aoki, Tochigi (JP); Wataru Toyama, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 256 days.

(21) Appl. No.: 17/792,904

(22) PCT Filed: Dec. 2, 2020

(86) PCT No.: PCT/JP2020/044883
§ 371 (c)(1),
(2) Date: Jul. 14, 2022

(87) PCT Pub. No.: WO2021/149364
PCT Pub. Date: Jul. 29, 2021

(65) Prior Publication Data
US 2023/0067126 A1   Mar. 2, 2023

(30) Foreign Application Priority Data

Jan. 21, 2020 (JP) ................. 2020-007217

(51) Int. Cl.
*B23K 11/11* (2006.01)
*B23K 11/24* (2006.01)
(Continued)

(52) U.S. Cl.
CPC ......... *B25J 9/1666* (2013.01); *B25J 15/0019* (2013.01); *B23K 11/115* (2013.01)

(58) Field of Classification Search
CPC ... B25J 9/1666; B25J 15/0019; B23K 11/115; B23K 11/24; G05B 2219/45104
See application file for complete search history.

(56) References Cited

U.S. PATENT DOCUMENTS

| | | | |
|---|---|---|---|
| 2004/0138779 A1* | 7/2004 | Shibata | B25J 9/1666 700/264 |
| 2016/0059413 A1* | 3/2016 | Ogata | B25J 9/1676 901/41 |
| 2019/0126479 A1* | 5/2019 | Motohashi | B25J 9/1694 |

FOREIGN PATENT DOCUMENTS

| | | |
|---|---|---|
| CN | 1507384 A | 6/2004 |
| JP | H01-107978 | 4/1989 |

(Continued)

OTHER PUBLICATIONS

Chinese Office Action dated Sep. 16, 2023 issued in corresponding Chinese application No. 202080092312.3; English translation included (18 pages).

(Continued)

*Primary Examiner* — Adam R Mott
*Assistant Examiner* — Heather J Keniry
(74) *Attorney, Agent, or Firm* — Rankin, Hill & Clark LLP

(57) ABSTRACT

The present invention includes a reference parallel line creation step of creating a pair of parallel lines that are respectively in contact with outer edges of a workpiece cross-section without traversing the workpiece cross-section and that are located on an extension plane of the workpiece cross-section, a first determination step of comparing a width between the pair of parallel lines that have been created in the reference parallel line creation step with a maximum separation threshold of the welding electrodes, and determining whether the maximum separation threshold is larger than the width between the parallel lines, and a (Continued)

pull-out direction determination step of determining a direction of the parallel lines as a pull-out direction, in a case where the maximum separation threshold is larger than the width between the parallel lines in the first determination step.

8 Claims, 13 Drawing Sheets

(51) Int. Cl.
*B25J 9/16* (2006.01)
*B25J 15/00* (2006.01)

(56) References Cited

FOREIGN PATENT DOCUMENTS

| | | |
|---|---|---|
| JP | 3715537 | 11/2005 |
| JP | 2018144161 A * | 9/2018 |
| WO | 2015/040980 | 3/2015 |

OTHER PUBLICATIONS

International Search Report, Date of mailing: Jan. 19, 2021, 2 pages.

* cited by examiner

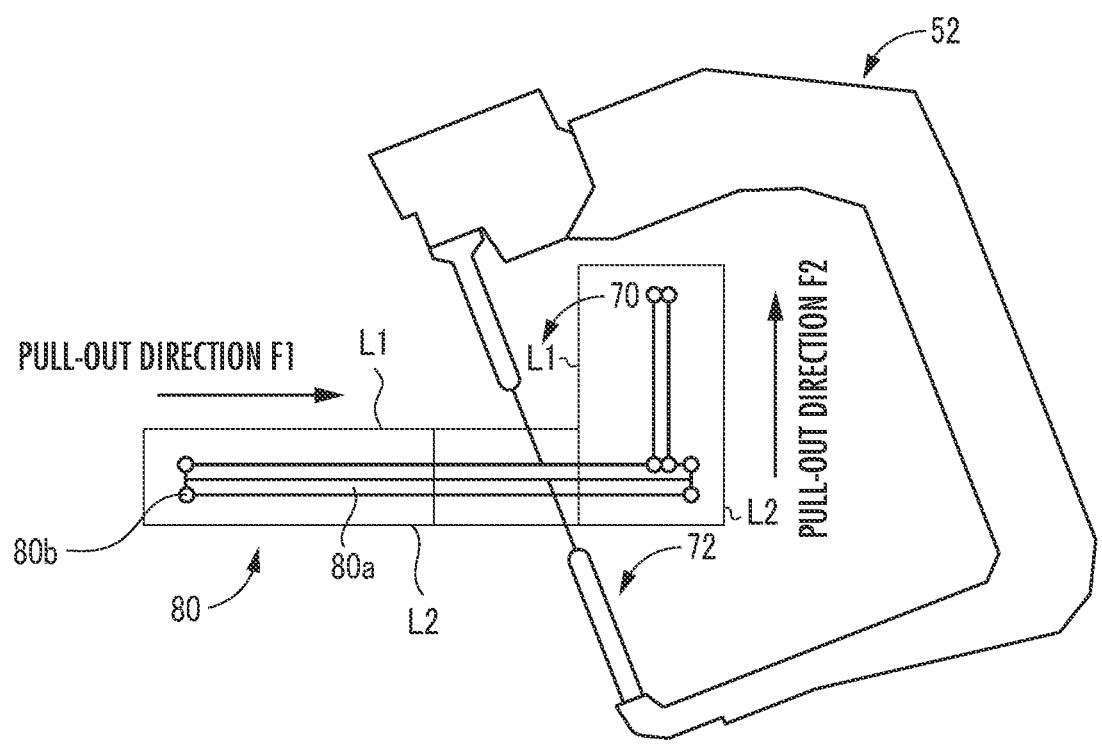

METHOD FOR AVOIDING INTERFERENCE OF WELDING EQUIPMENT, AND DEVICE FOR CONTROLLING WELDING EQUIPMENT

TECHNICAL FIELD

The present invention relates to a method for avoiding interference of welding equipment and a device for controlling the welding equipment, and relates more particularly to a method for avoiding interference of welding equipment and a device for controlling the welding equipment that obtain an entry path and a return path along which the welding equipment including an articulated robot provided with a gun unit is capable of reaching a welding point with accuracy without interfering with a workpiece.

BACKGROUND ART

Conventionally, in trying to conduct teaching about a working posture by directly operating welding equipment including an articulated robot installed in a manufacturing line, an operator who is well familiar with an operation of the articulated robot has to conduct work on the manufacturing line on site. Hence, the work becomes inefficient, accordingly. In addition, such work has to be conducted in a state where the manufacturing line is stopped, and thus the operation rate of the manufacturing line also decreases.

For such a reason, in these years, in order to improve efficiency of the teaching or to improve the operation rate of the manufacturing line, teaching by off line (off-line teaching) is conducted. That is, a model including an articulated robot, a workpiece that is a work object, and their peripheral structures is constructed on a computer. After teaching data is created with use of this model, the teaching data is supplied to the articulated robot on site. Thus, it is no longer necessary to stop the manufacturing line during the creation of the teaching data.

Further, there is also known a method for avoiding interference of an articulated robot, in which in a case where the off-line teaching about a pull-out path, among working paths of the articulated robot, is conducted so as not to interfere with a workpiece, particularly when a gun unit is pulled out of a welding point, a process of filling an inside of the gun unit with a grid-shaped solid, extracting a part where the solid and the workpiece overlap as a work model, making an interference determination, and determining the pull-out path is automated, so that teaching data can be created in a short time without the need of a skillful technique (e.g., refer to JP 3715537 B2).

CITATION LIST

Patent Literature

Patent Literature 1: JP 3715537 B2

SUMMARY OF INVENTION

Technical Problem

In the conventional method for avoiding interference of welding equipment, the part where the solid and the workpiece overlap is used as the work model. Accordingly, the clearance between a welding electrode and the workpiece is ensured more than necessary, and in practice, even in a case where the welding equipment can be retracted from the welding point, it may be determined that the welding equipment cannot be retracted.

The present invention has an object to provide a method for avoiding interference of an articulated robot and a device for controlling an articulated robot capable of further appropriately automating a process of determining a path and creating more appropriate teaching data in a short time without the need of a skillful technique, particularly in a case of off-line teaching about a pull-out path that does not interfere with a workpiece among working paths of the articulated robot, when a gun unit is pulled out of a welding point.

Solution to Problem

[1] In order to achieve the above object, the present invention relates to a method for avoiding interference of welding equipment, when the welding equipment including a pair of welding electrodes is pulled out of a workpiece, for avoiding the interference between the pair of welding electrodes and the workpiece, and the method characterized by including:

with a workpiece cross-section as a reference, the workpiece cross-section including a plane including an electrode straight line and a pull-out straight line, the electrode straight line connecting tip ends of the pair of the welding electrodes separated from each other, the pull-out straight line intersecting with the electrode straight line and extending in a direction of pulling out the welding equipment from the workpiece, a reference parallel line creation step of creating a pair of parallel lines that are respectively in contact with outer edges of the workpiece cross-section without traversing the workpiece cross-section and that are located on an extension plane of the workpiece cross-section;

a first determination step of comparing a width between the pair of parallel lines that have been created in the reference parallel line creation step with a maximum separation threshold of the welding electrodes, and determining whether the maximum separation threshold is larger than the width between the parallel lines; and a pull-out direction determination step of determining a direction of the parallel lines as a pull-out direction, in a case where the maximum separation threshold is larger than the width between the parallel lines in the first determination step.

According to the method for avoiding the interference of the welding equipment of the present invention, the parallel lines are set to be respectively in contact with the outer edges of the workpiece cross-section without traversing the workpiece cross-section. Therefore, the pair of parallel lines that are respectively in contact with the outer edges of the workpiece cross-section and that are located on the extension plane of the workpiece cross-section are created with the workpiece cross-section as a reference, the width between the parallel lines is compared with the maximum separation threshold between the welding electrodes, and whether the maximum separation threshold is larger is determined. In a case where the maximum separation threshold is larger, the direction of the reference parallel line can be determined as the pull-out direction, and efficient pull-out direction determination work for pulling out the welding equipment from the workpiece can be provided.

In addition, the parallel lines are set to be respectively in contact with the outer edges of the workpiece cross-section without traversing the workpiece cross-section, the clearance between the welding electrodes and the workpiece can be more appropriately set than a conventional case where an overlapping part of the grid-shaped solid and the workpiece is used as a work model.

[2] In addition, in the present invention,
it is preferable that a region including an entirety of the workpiece cross-sections is set as an interference avoidance region into which an entry of the welding electrodes of the welding equipment while making a pull-out movement is avoided, and
in a case where it is determined in the first determination step that the maximum separation threshold is not larger than the width between the parallel lines, the interference avoidance region is divided, the parallel lines that are respectively in contact with the outer edges of the workpiece cross-section are created again in the reference parallel line creation step for each divided interference avoidance region, and then the first determination step is performed.

According to the present invention, the interference avoidance region is set, the interference avoidance region is divided, and the parallel lines are set for each of the interference avoidance regions that have been divided. Therefore, even in a case where the maximum separation threshold does not become larger than the width between the parallel lines even when the direction of the parallel lines is changed without dividing the interference avoidance region, the interference avoidance region can be divided, the parallel lines can be appropriately set for each of the interference avoidance regions that have been divided, and the welding electrodes can be appropriately retracted from the workpiece.

[3] In addition, in the present invention,
it is preferable that a region including an entirety of the workpiece cross-sections is set as an interference avoidance region into which an entry of the welding electrodes of the welding equipment while making a pull-out movement is avoided, and
in a case where it is determined in the first determination step that the maximum separation threshold is not larger than the width between the parallel lines, the direction of the parallel lines is changed, and the process is performed again from the reference parallel line creation step in the interference avoidance region.

According to the present invention, even in a case where it is determined in the first determination step that the maximum separation threshold is not larger than the width between the parallel lines, the direction of the parallel lines is changed, the process is performed again, and thus appropriate parallel lines can be set.

[4] In addition, in the present invention,
it is preferable to include a second determination step of determining whether an outer edge of another part of the welding equipment excluding the welding electrodes interferes with the workpiece cross-section during an operation of pulling out the welding electrodes from the workpiece cross-section.

According to the present invention, the outer edge of another part of the welding equipment excluding the welding electrodes of the articulated robot or the like can be prevented from interfering with the workpiece cross-section.

[5] In addition, a device for controlling welding equipment according to the present invention is a device for controlling welding equipment for avoiding interference between a pair of welding electrodes and a workpiece, when the welding equipment including the pair of welding electrodes is pulled out of the workpiece, and the device is characterized by including:
with a workpiece cross-section as a reference, the workpiece cross-section including a plane including an electrode straight line and a pull-out straight line, the electrode straight line connecting tip ends of the pair of the welding electrodes separated from each other, the pull-out straight line intersecting with the electrode straight line and extending in a direction of pulling out the welding equipment from the workpiece,
a reference parallel line creation step of creating a pair of parallel lines that are respectively in contact with outer edges of the workpiece cross-section without traversing the workpiece cross-section and that are located on an extension plane of the workpiece cross-section;
a first determination step of comparing a width between the pair of parallel lines that have been created in the reference parallel line creation step with a maximum separation threshold of the welding electrodes, and determining whether the maximum separation threshold is larger than the width between the parallel lines; and
a pull-out direction determination step of determining a direction of the parallel lines as a pull-out direction, in a case where the maximum separation threshold is larger than the width between the parallel lines in the first determination step.

According to the device for controlling the welding equipment of the present invention, the parallel lines are set to be respectively in contact with the outer edges of the workpiece cross-section. Therefore, the pair of parallel lines that are respectively in contact with the outer shape of the workpiece cross-section and that are located on the extension plane of the workpiece cross-section are created with the workpiece cross-section including a direction of connecting the welding electrodes and a direction of pulling out the welding electrodes as a reference, the width between the reference parallel lines is compared with the maximum separation threshold between the welding electrodes, and whether the maximum separation threshold is larger is determined. In a case where the maximum separation threshold is larger, the direction of the reference parallel line can be determined as the pull-out direction, and efficient pull-out direction determination work for pulling out the welding equipment from the workpiece can be provided.

In addition, the parallel lines are set to be respectively in contact with the outer edges of the workpiece cross-section without traversing the workpiece cross-section, the clearance between the welding electrodes and the workpiece can be more appropriately set than a conventional case where an overlapping part of the grid-shaped solid and the workpiece is used as a work model.

[6] In addition, in the present invention,
it is preferable that a region including an entirety of the workpiece cross-sections is set as an interference avoidance region into which an entry of the welding electrodes of the welding equipment while making a pull-out movement is avoided, and
in a case where it is determined in the first determination step that the maximum separation threshold is not larger than the width between the parallel lines, the interference avoidance region is divided, the parallel lines that are respectively in contact with the outer edges of the workpiece cross-section are created again in the reference parallel line creation step for each of the interference avoidance region, and then the first determination step is performed.

According to the present invention, the interference avoidance region is set, the interference avoidance region is divided, and the parallel lines are set for each of the interference avoidance regions that have been divided. Therefore, even in a case where the maximum separation threshold does not become larger than the width between the parallel lines even when the direction of the parallel lines is changed without dividing the interference avoidance region, the interference avoidance region can be divided, the parallel lines can be appropriately set for each of the interference avoidance regions that have been divided, and the welding electrodes can be appropriately retracted from the workpiece.

[7] In addition, in the present invention,
it is preferable that a region including an entirety of the workpiece cross-sections is set as an interference avoidance region into which an entry of the welding electrodes of the welding equipment while making a pull-out movement is avoided, and
in a case where it is determined in the first determination step that the maximum separation threshold is not larger than the width between the parallel lines, the direction of the parallel lines is changed, and the process is performed again from the reference parallel line creation step in the interference avoidance region.

According to the present invention, even in a case where it is determined in the first determination step that the maximum separation threshold is not larger than the width between the parallel lines, the direction of the parallel lines is changed, the process is performed again, and thus appropriate parallel lines can be set.

[8] In addition, in the present invention
it is preferable to include a second determination step of determining whether an outer edge of another part of the welding equipment excluding the welding electrodes interferes with the workpiece cross-section during an operation of pulling out the welding electrodes from the workpiece cross-section.

According to the present invention, the outer edge of another part of the welding equipment excluding the welding electrodes of the articulated robot or the like can be prevented from interfering with the workpiece cross-section.

BRIEF DESCRIPTION OF DRAWINGS

FIG. 13 is an explanatory diagram illustrating a state in which the gun unit is pulled out of a workpiece cross-section divided into a plurality of regions.

DESCRIPTION OF EMBODIMENTS

A method for avoiding interference of welding equipment and a device for controlling the welding equipment according to the present invention will be described with reference to the drawings.

Figure 1:
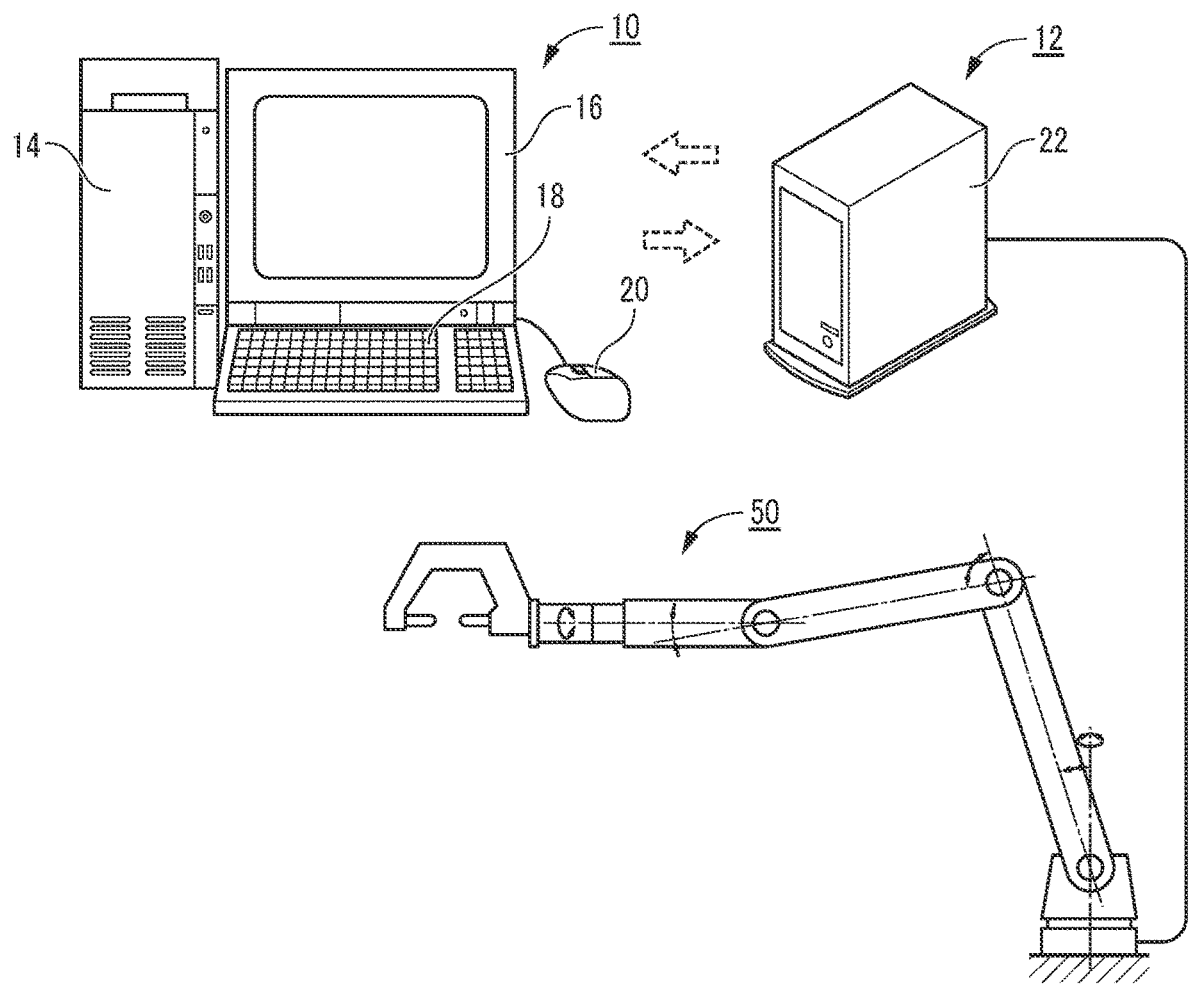
FIG. 1 is a configuration diagram illustrating an off-line teaching apparatus and a robot device for use in a method for avoiding interference of welding electrodes and a device for controlling welding electrodes according to the present invention.

FIG. 1 illustrates an off-line teaching apparatus 10 used in the present embodiment and a robot device 12 that conducts desired work on a work object, based on teaching data that has been created by the off-line teaching apparatus 10.

The off-line teaching apparatus 10 includes a control unit 14, a monitor 16, and a keyboard 18 and a mouse 20 for giving input and output instructions to the control unit 14, and conducts teaching about the operation of an articulated robot 50.

The robot device 12 includes the articulated robot 50 as welding equipment, and a robot control unit 22 that controls the operation of the articulated robot 50, based on the teaching data.

Figure 3:
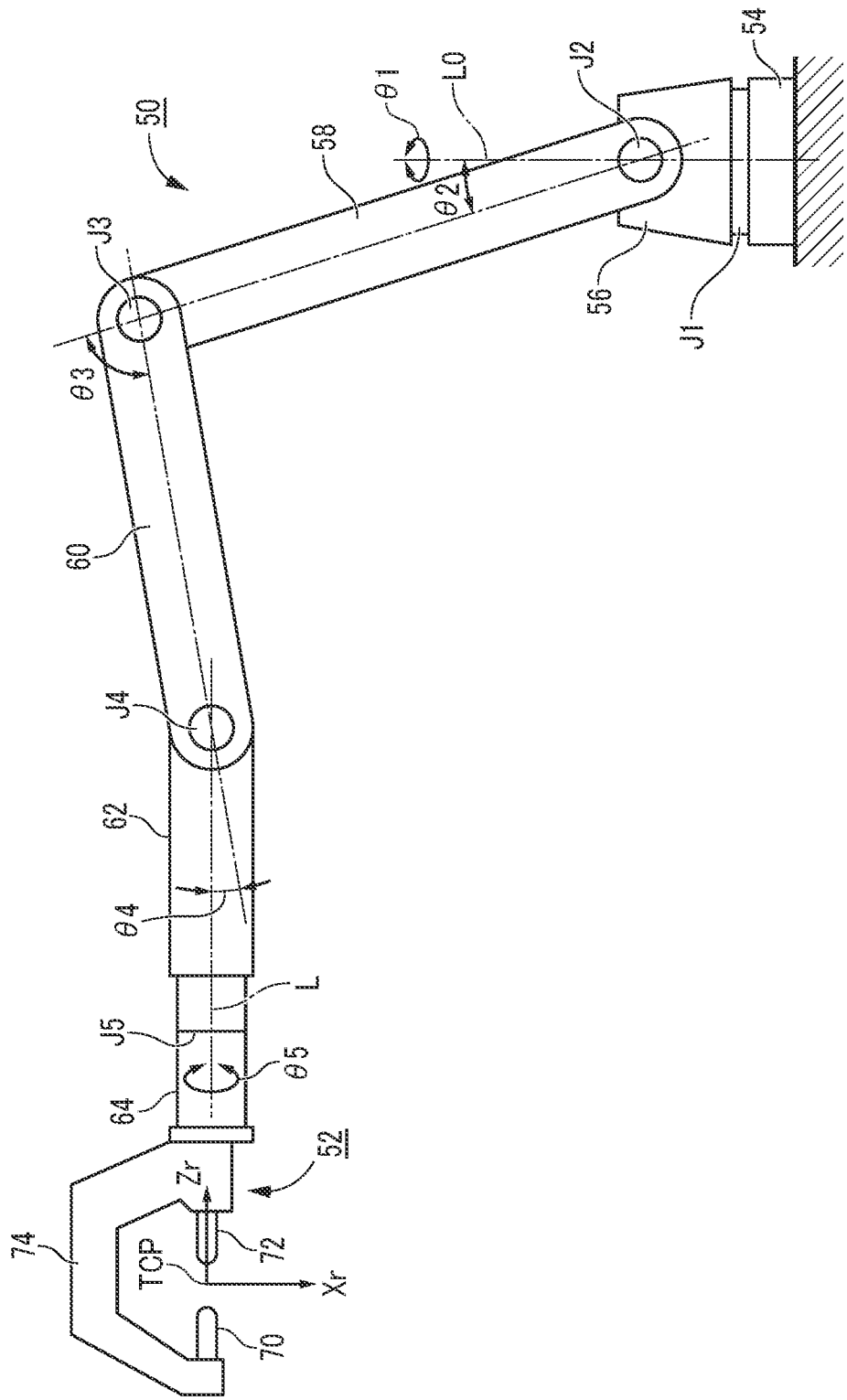
FIG. 3 is an explanatory diagram illustrating a configuration of an articulated robot.
Figure 4:
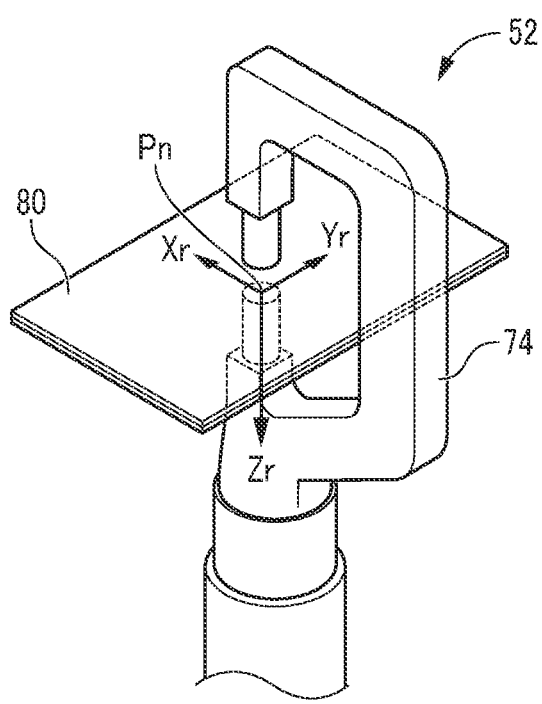
FIG. 4 is an explanatory diagram illustrating a gun unit.

As illustrated in FIGS. 3 and 4, the articulated robot 50 includes a first base 54 as a mounting base, a second base 56, a first link 58, a second link 60, a third link 62, a gun attaching and detaching portion 64 having a cylindrical shape, and the like, and a gun unit 52 is connected with the gun attaching and detaching portion 64.

In addition, the first base 54 and the second base 56 are connected by a shaft J1 that rotates about a vertical axis L0 as its axial center. The second base 56 and a base end of the first link 58 are connected by a shaft J2 that rotates on a vertical plane, a tip end of the first link 58 and a base end of the second link 60 are connected by a shaft J3 that rotates on a vertical plane. In addition, a tip end of the second link 60 and a base end of the third link 62 are connected by a shaft J4 that rotates on a vertical plane. A tip end of the third link 62 is connected with the gun attaching and detaching portion 64 by a shaft J5, and the shaft J5 rotates about a center axis L of the third link 62 as its center.

Further, the gun unit 52 connected with the gun attaching and detaching portion 64 is a so-called C-type welding gun, and includes a pair of electrodes 70 and 72, which open and close along the center axis L. The electrodes 70 and 72 in a closed state come into contact with a workpiece 80 at a welding work point (hereinafter, referred to as a tool center point (TCP)) on the center axis L.

A direction from the TCP to be coincident with the axial center of the electrode 72 on the main body side is defined as an electrode vector Zr (gun unit reference vector), and a direction orthogonal to the electrode vector Zr and facing the opposite side of an arm 74 is defined as an arm vector Xr.

In addition, a direction orthogonal to the arm vector Xr and the electrode vector Zr is defined as a lateral vector Yr (see FIG. 4).

A drive mechanism of the shafts J1, J2, J3, J4, and J5 and an opening and closing mechanism of the electrodes 70 and 72 are each actuated by an actuator, not illustrated. TCP is determined by a rotation angle θ1 of the shaft J1, a rotation angle θ2 of the shaft J2, a rotation angle θ3 of the shaft J3, a rotation angle θ4 of the shaft J4, a rotation angle θ5 of the shaft J5, and the dimensions of the respective parts of the articulated robot 50.

In the present embodiment, the articulated robot 50 has been described as a five-shaft type. However, it is needless to say that an articulated robot having six or more shafts is applicable, and the shaft referred to herein includes not only a rotation operation but also an expansion and contraction operation and a movement operation.

Figure 5:
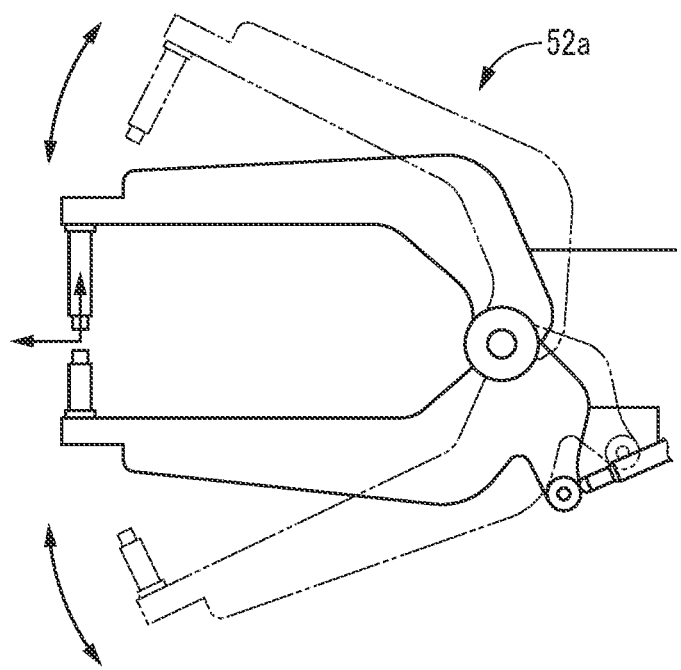
FIG. 5 is an explanatory diagram illustrating an X-type welding gun.

Further, the gun unit 52 is not limited to the C-type welding gun, and may be, for example, an X-type welding gun (a welding gun including a pair of gun arms that open and close and that are pivotally supported by a common support shaft) 52a illustrated in FIG. 5.

Figure 2:
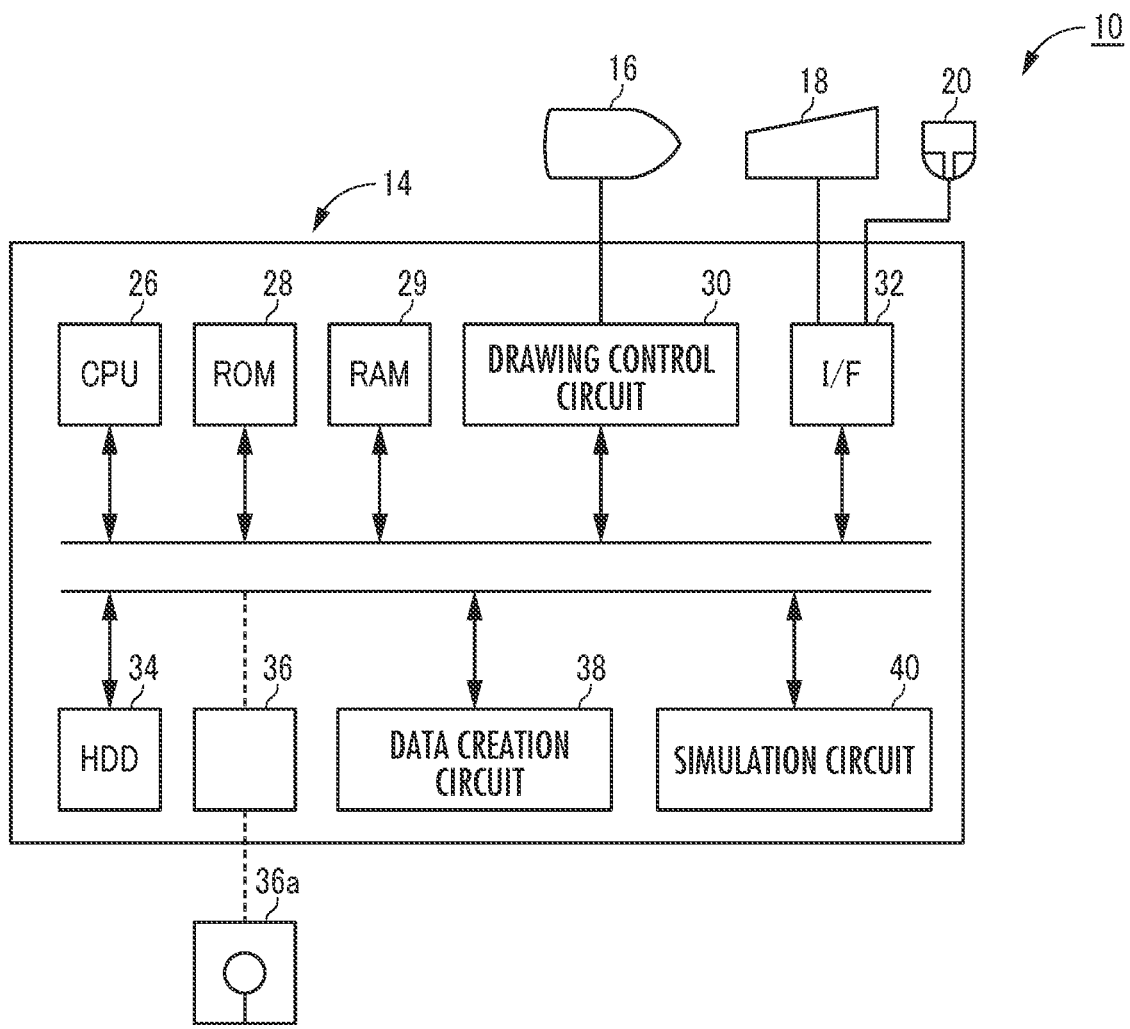
FIG. 2 is a block diagram illustrating a circuit structure of a control unit in an off-line teaching apparatus.

As illustrated in FIG. 2, the control unit 14 constituting the off-line teaching apparatus 10 includes a CPU 26 that controls the entire off-line teaching apparatus 10, a ROM 28 that is a nonvolatile storage unit, a RAM 29 that is a volatile storage unit, a hard disk drive (HDD) 34, a drawing control circuit 30 that controls drawing on the screen of the monitor 16, an interface circuit 32 to which the keyboard 18 and the mouse 20 are connected, a recording medium drive 36 that controls an external recording medium 36a, a data creation circuit 38 that creates teaching data, and a simulation circuit 40 that performs simulation on the screen of the monitor 16, based on the teaching data. The simulation circuit 40 is based on three-dimensional CAD, and has functions of creating the model and investigating interference (contact or the like) between the models.

Next, a method for avoiding interference of the articulated robot according to the present embodiment will be described.

In the present embodiment, three methods are mainly used for obtaining a path for pulling out the gun unit 52 from a weld portion of the workpiece 80.

A first method is a method for directly moving the workpiece from the weld portion to a pull-out point, a second method is a method for moving the workpiece from the weld portion to the center of gravity of the workpiece 80, and a third method is a method for extracting only a portion of the workpiece 80 close to an opening part of the gun unit 52 and obtaining a pull-out path with the extracted portion on a priority basis.

In addition, although the projection model is used for the workpiece 80, a pair of parallel lines respectively in contact with outer edges (vertices) of the workpiece 80 are used for interference avoidance. Thus, it is possible to speed up the process.

Note that in the present embodiment, the articulated robot 50, the workpiece 80, and their peripheral structures are treated as virtual models in the off-line teaching apparatus 10. However, in the following description, the same reference numerals as those of the actual device will be indicated.

Figure 6:
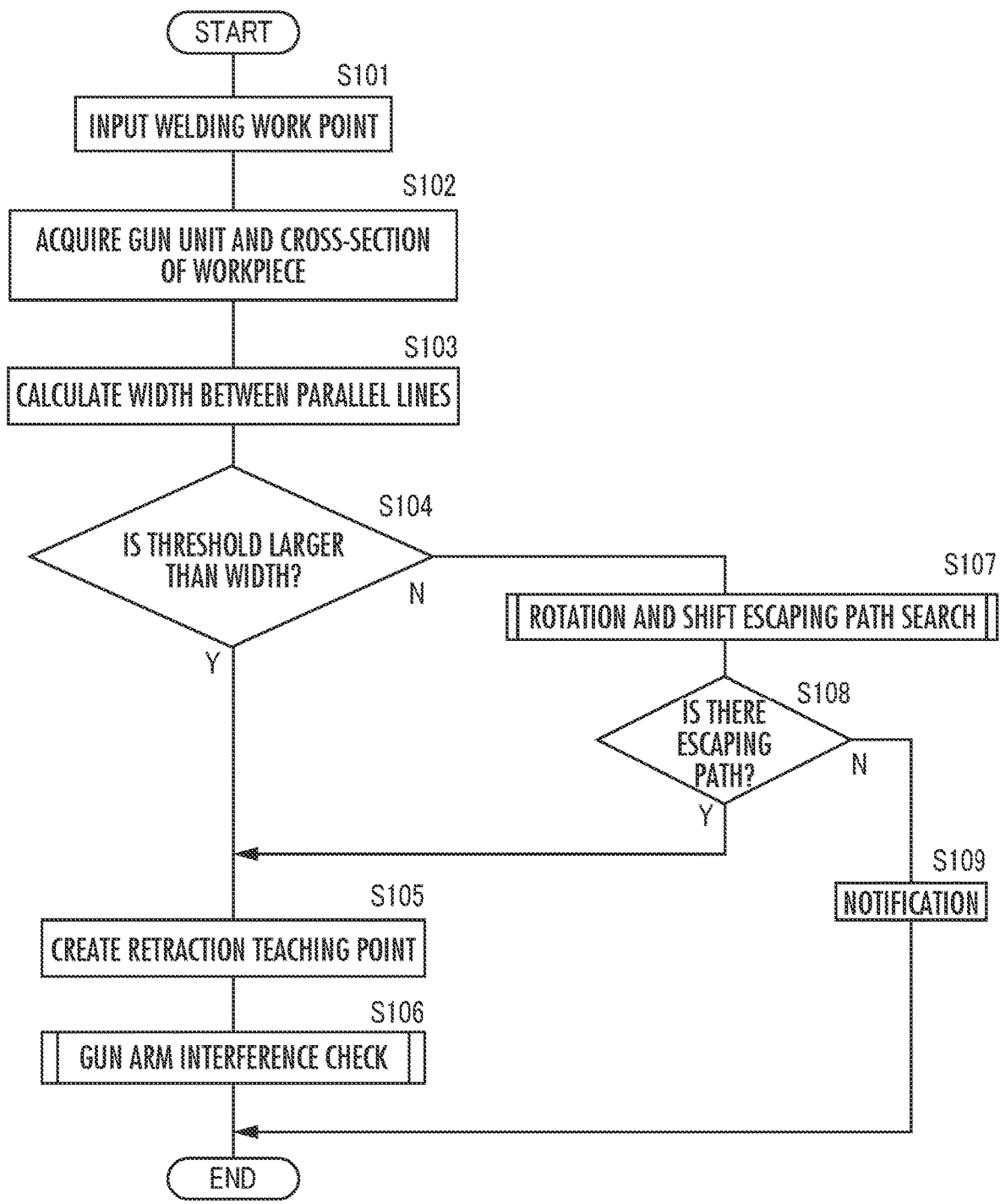
FIG. 6 is a flowchart illustrating the method for avoiding interference of the welding electrodes and the device for controlling the welding electrodes according to the present invention.

First, in step S101 of FIG. 6, the gun unit 52 of the articulated robot 50 is set at a position where a welding work point Pn of the workpiece 80 is welded.

The welding work point Pn (n indicates the order of the posture taken by the articulated robot 50. The same applies to the following) includes six coordinate values in total of three coordinate values in directions of a height (H), a width (W), and a depth (D) each representing a position in a space, and the arm vector Xr, the lateral vector Yr, and the electrode vector Zr.

Then, the welding work point P0 is an initial position, and is written for initialization in a path table that is a table indicating the order of the posture taken by the articulated robot 50.

The path table includes a "gun unit orientation" column, a "TCP position" column, and an "articulated robot posture" column, and the "articulated robot posture" column includes rotation angles θ1 to θ5.

Note that the path table is recorded in the RAM 29 or the HDD 34, but can be displayed on the screen of the monitor 16 or printed, as necessary.

Next, in step S102 of FIG. 6, the gun unit 52 and a cross-section 80a of the workpiece 80 are acquired, and TCP of the gun unit 52 located at the welding work point P0 is set as an investigation start position Ps. The workpiece cross-section 80a is defined as a cross-section cut along a plane including an electrode straight line L70 connecting tip ends of the pair of welding electrodes 70 and 72 separated from each other, and a pull-out straight line L50 intersecting with the electrode straight line L70 and extending in a direction of pulling out the gun unit 52 serving as welding equipment and the articulated robot 50 from the workpiece 80.

Next, in step S103, a pair of parallel lines L1 and L2 are set, and a width (distance in a direction orthogonal to parallel lines L1 and L2) between the parallel lines L1 and L2 is calculated. In addition, a value obtained by subtracting the minimum clearance necessary when the welding electrodes 70 and 72 are pulled out of the workpiece 80 from the distance between the tip ends of the welding electrodes 70 and 72 when the tip ends of the welding electrodes 70 and 72 are widened to the maximum is stored as a maximum separation threshold.

Next, in step S104, it is determined whether the width between the parallel lines L1 and L2 is smaller than the maximum separation threshold.

In a case where the width between the parallel lines L1 and L2 is smaller than the maximum separation threshold ("Y" in S104), the process proceeds to step S105 to create a retraction teaching point.

Then, in step S106, a process of confirming whether the arm of the articulated robot 50 does not interfere with the workpiece 80 is performed, and the current process ends. In the confirmation of the interference of the articulated robot 50, the posture of the articulated robot 50, that is, the rotation angles θ1 to θ5 are obtained, based on the position and the posture of the gun unit 52 that are defined by a pull-out position. To this operation method, it is sufficient if a matrix operation method (hereinafter, referred to as an inverse operation) is applied, known from six values in total defined by the position coordinates (H, W, D) of the pull-out position in a space, the arm vector Xr, the lateral vector Yr, and the electrode vector Zr each representing the posture of the gun unit 52, and the dimensions of the respective parts of the articulated robot 50, and the like.

In this manner, in the present embodiment, with use of the projection model of the workpiece 80 instead of determining the workpiece 80 in the block model with the grid-shaped solid, the gap between the tip ends of the welding electrodes 70 and 72 and the workpiece 80 can be managed more appropriately than a conventional case. In addition, the determination for avoiding interference of the welding electrodes 70 and 72 is made with use of the pair of parallel lines L1 and L2. Thus, the process is facilitated in a similar manner to the determination with use of the conventional block model.

In a case where the width between the parallel lines L1 and L2 is not smaller than the maximum separation threshold in step S104, the process branches to step S107, and performs a "rotation and shift escaping path search process".

Then, the process proceeds to step S108, and in a case where the escaping path, that is, an interference avoidance path is found, the process returns to step S105 and creates a retraction teaching point. Note that in the present embodiment, the description is given with regard to the case of retraction. However, it is possible to similarly apply the present embodiment to a case where the gun unit 52 is caused to move to the welding work point without interfering with the workpiece 80.

In a case where the escaping path, that is, the interference avoidance path is not found in step S108, the process proceeds to step S109, and notifies that the gun unit 52 cannot retract from the workpiece 80, and the current process ends.

In subsequent steps S8 to S12, as illustrated in FIG. 13, an investigation is conducted for whether interference does not occur when it is linearly caused to move from the investigation start position Ps to the pull-out position (investigation end position) Pe.

Figure 7:
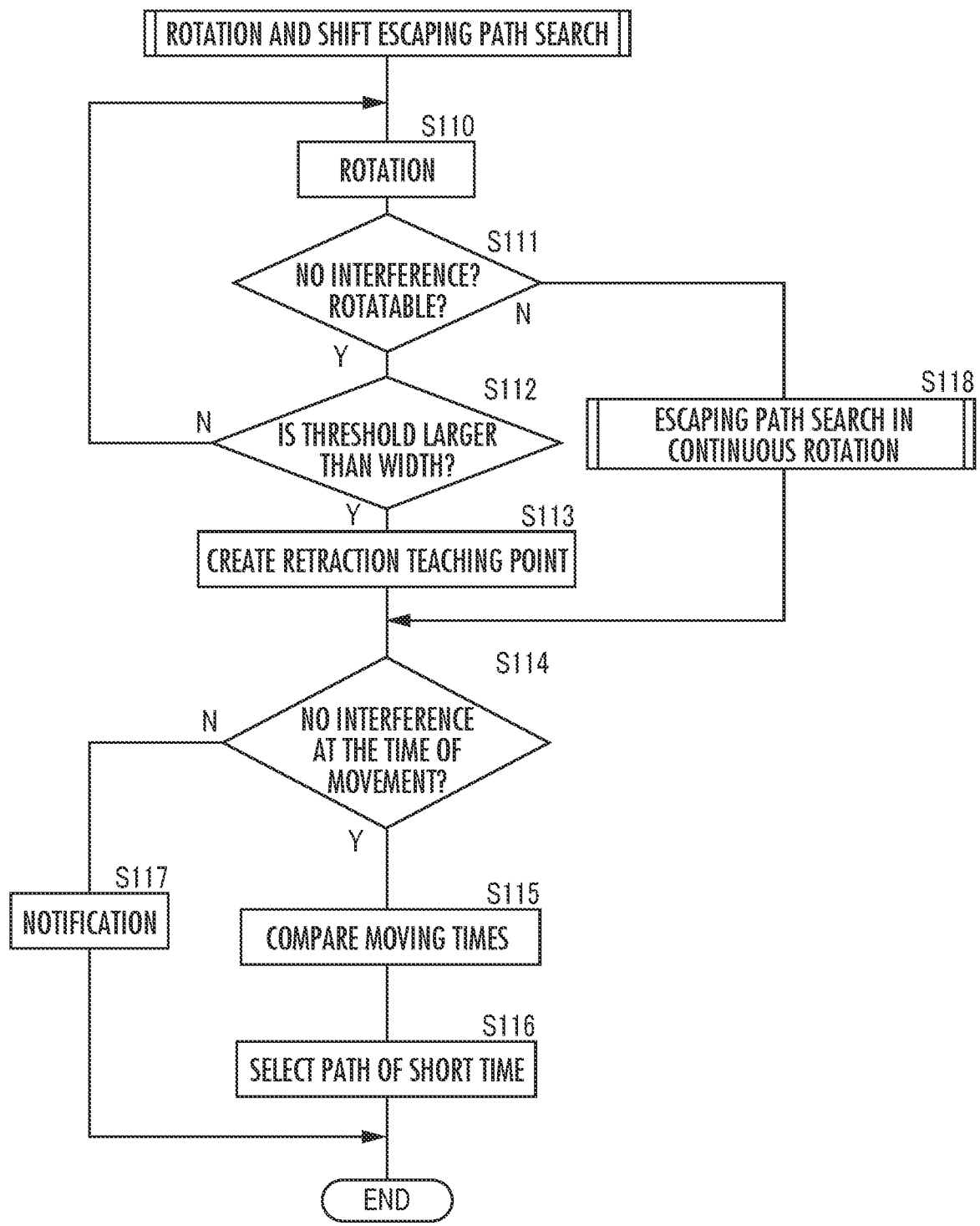
FIG. 7 is a flowchart illustrating a first determination step according to the present embodiment.

FIG. 7 is a flowchart illustrating the "rotation and shift escaping path search process" in step S107 of FIG. 6.

First, in step S110, the workpiece 80 or the gun unit 52 is caused to rotate about the welding work point as its center by a predetermined angle (for example, ±5 degrees). Then, in step S111, it is determined whether the articulated robot 50 is capable of coping with the rotation up to the rotation angle set in S110, and whether the gun unit 52 and the articulated robot 50 do not interfere with the workpiece 80.

In a case where it is rotatable and no interference occurs, the process proceeds to step S112, and it is determined whether the maximum separation threshold is larger than the width between the parallel lines L1 and L2.

In a case where the maximum separation threshold is not larger than the width between the parallel lines L1 and L2, the process returns to step S110, and the workpiece 80 or the gun unit 52 is further caused to rotate.

In a case where the maximum separation threshold is larger than the width between the parallel lines L1 and L2 in step S112, the process proceeds to step S113 to create a retraction teaching point.

Then, the process proceeds to step S114, and it is determined whether the gun unit 52 and the articulated robot 50 do not interfere with the workpiece 80, when the gun unit 52 is caused to move through the retraction teaching point.

Then, the process proceeds to step S115, and in a case where the gun unit 52 and the workpiece 80 rotate a plurality of times and there are a plurality of retraction paths, the times necessary for the movements in the respective retraction paths are compared with each other.

Then, the process proceeds to step S116, and a retraction path having a shortest moving time is selected from the retraction paths, and the current process ends.

In step S114, in a case where the interference occurs while moving through the retraction teaching point, the process branches to step S117 to notify that the interference will occur, and the current process ends.

In step S111, in a case where neither the workpiece 80 nor the gun unit 52 is capable of rotating or the workpiece 80 and the gun unit 52 interfere with the workpiece 80 when they are caused to rotate, the process branches to step S118. After performing an "escaping path search process in continuous rotation", the process returns to step S114 to determine whether neither the gun unit 52 nor the articulated robot 50 interferes with the workpiece 80 when the gun unit 52 is caused to move through the retraction teaching point.

Figure 8:
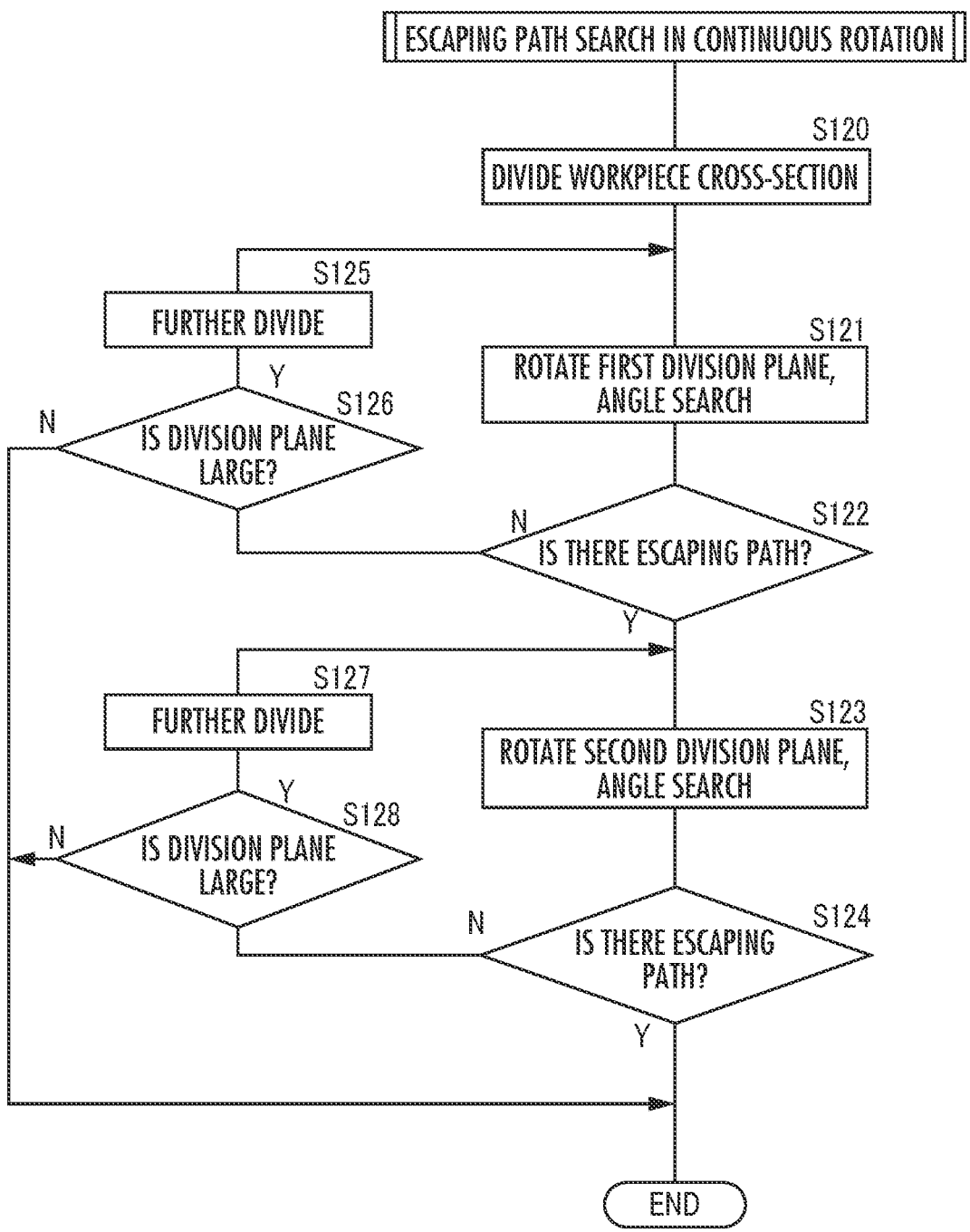
FIG. 8 is a flowchart illustrating a step of dividing an interference avoidance region according to the present embodiment.

FIG. 8 is a flowchart illustrating the "escaping path search process in continuous rotation" in step S118 in FIG. 7.

Figure 10:
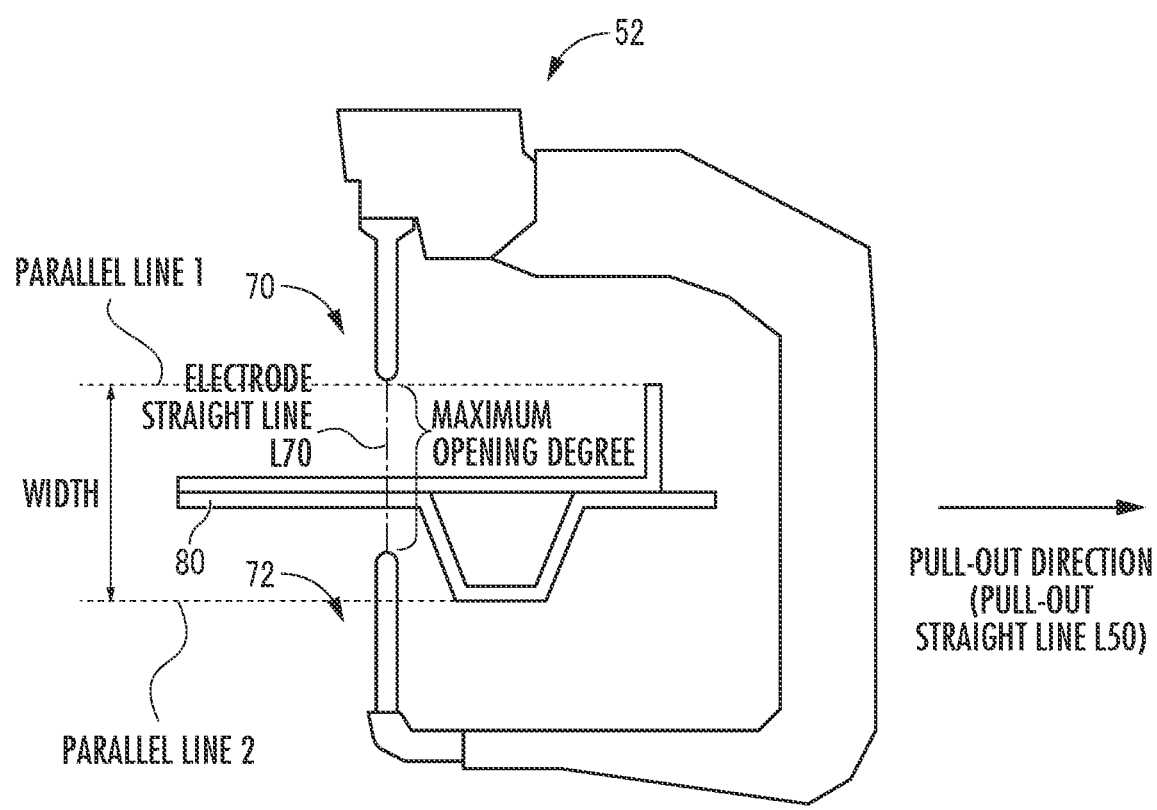
FIG. 10 is an explanatory diagram illustrating parallel lines and a maximum opening degree to be a reference of a maximum separation threshold.

In the "escaping path search process in continuous rotation", first, an interference avoidance region is set in step S120. Referring to FIG. 10, the interference avoidance region is set to include all vertices of the workpiece 80 between the parallel lines L1 and L2 (as a rectangular space, for example). Note that it is sufficient if the interference avoidance region is a region between the parallel lines L1 and L2 and including all vertices of the workpiece cross-section 80a, and is not limited to the rectangular space.

Figure 11:
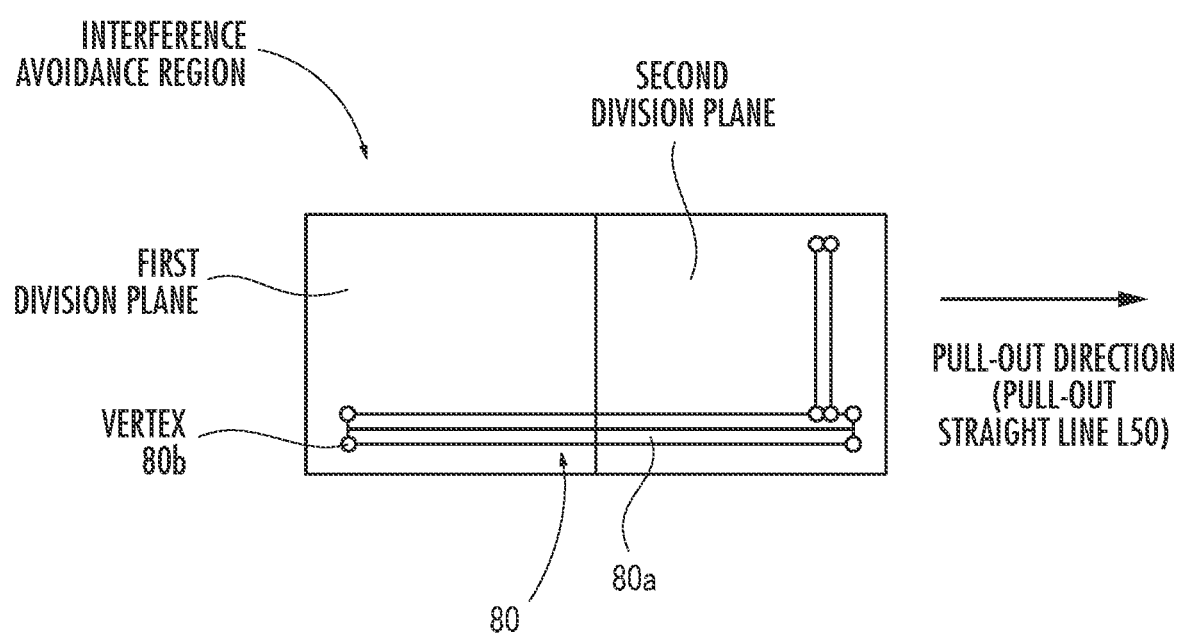
FIG. 11 is an explanatory diagram illustrating a first division plane and a second division plane.
Figure 12:
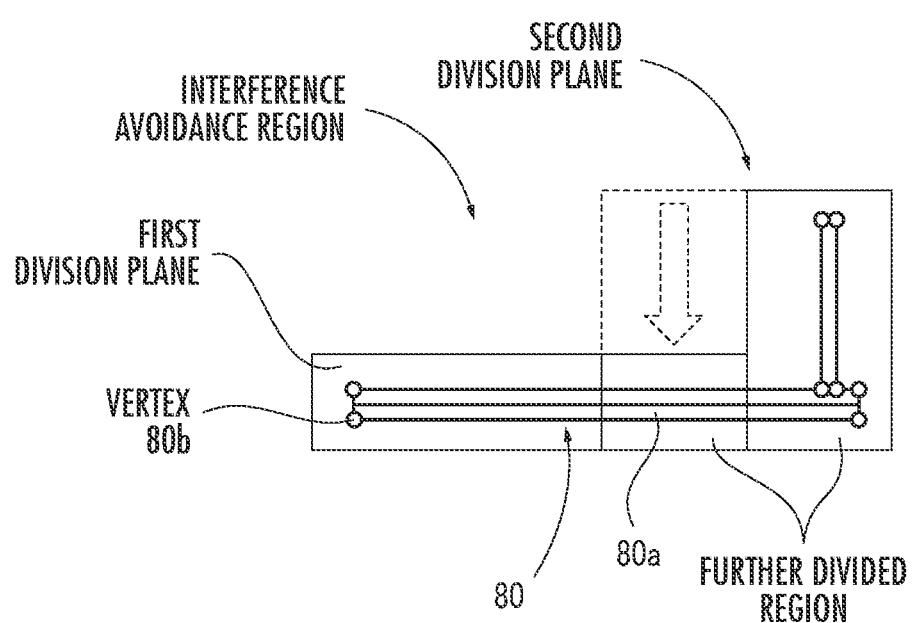
FIG. 12 is an explanatory diagram illustrating a state in which the second division plane is further divided.

Then, as illustrated in FIG. 11, the interference avoidance region is divided into two of a first division plane and a second division plane in accordance with a pull-out direction.

Then, the process proceeds to step S121, causes the gun unit 52 and the workpiece cross-section 80a to rotate on the first division plane to set the parallel lines L1 and L2, and searches for whether there is a path along which the gun unit 52 can be pulled out of the workpiece 80, while the maximum separation threshold is larger than the width between the parallel lines L1 and L2.

Next, the process proceeds to step S122, and it is determined whether there is an escaping path, that is, a retraction path along which the gun unit 52 can be pulled out of the workpiece 80 on the first division plane.

In a case where there is the retraction path, the process proceeds to step S123. The gun unit 52 and the workpiece cross-section 80a are caused to rotate on the second division plane to set the parallel lines L1 and L2, and whether there is a path along which the gun unit 52 can be pulled out of the workpiece 80 is searched for, while the maximum separation threshold is larger than the width between the parallel lines L1 and L2.

Next, the process proceeds to step S124, and it is determined whether there is an escaping path, that is, a retraction path along which the gun unit 52 can be pulled out of the workpiece 80 on the second division plane.

In a case where there is the retraction path, the current process ends.

In step S122, in a case where there is no retraction path on the first division plane, the process branches to step S126, and it is determined whether the first division plane is large enough to set a plurality of teaching points. In a case where the first division plane is not large enough to set a plurality of teaching points, the current process ends as it is.

In step S126, in a case where the first division plane is large enough to set a plurality of teaching points, the process proceeds to step S125, further divides the first division plane into two, and then returns to step S121. The gun unit 52 and the workpiece cross-section 80a are caused to rotate for each of the further divided regions to set the parallel lines L1 and L2, and whether there is a path along which the gun unit 52 can be pulled out of the workpiece 80 is searched for, while the maximum separation threshold is larger than the width between the parallel lines L1 and L2.

In step S124, in a case where there is no retraction path on the second division plane, the process branches to step S128, and it is determined whether the second division plane is large enough to set a plurality of teaching points. In a case where the second division plane is not large enough to set a plurality of teaching points, the current process ends as it is.

In step S128, in a case where the second division plane is large enough to set a plurality of teaching points, the process proceeds to step S127, further divides the second division plane into two, and then the process returns to step S123. The gun unit 52 and the workpiece cross-section 80a are caused to rotate for each of the further divided regions to set the parallel lines L1 and L2, and whether there is a path along which the gun unit 52 can be pulled out of the workpiece 80 is searched for, while the maximum separation threshold is larger than the width between the parallel lines L1 and L2.

Figure 9:
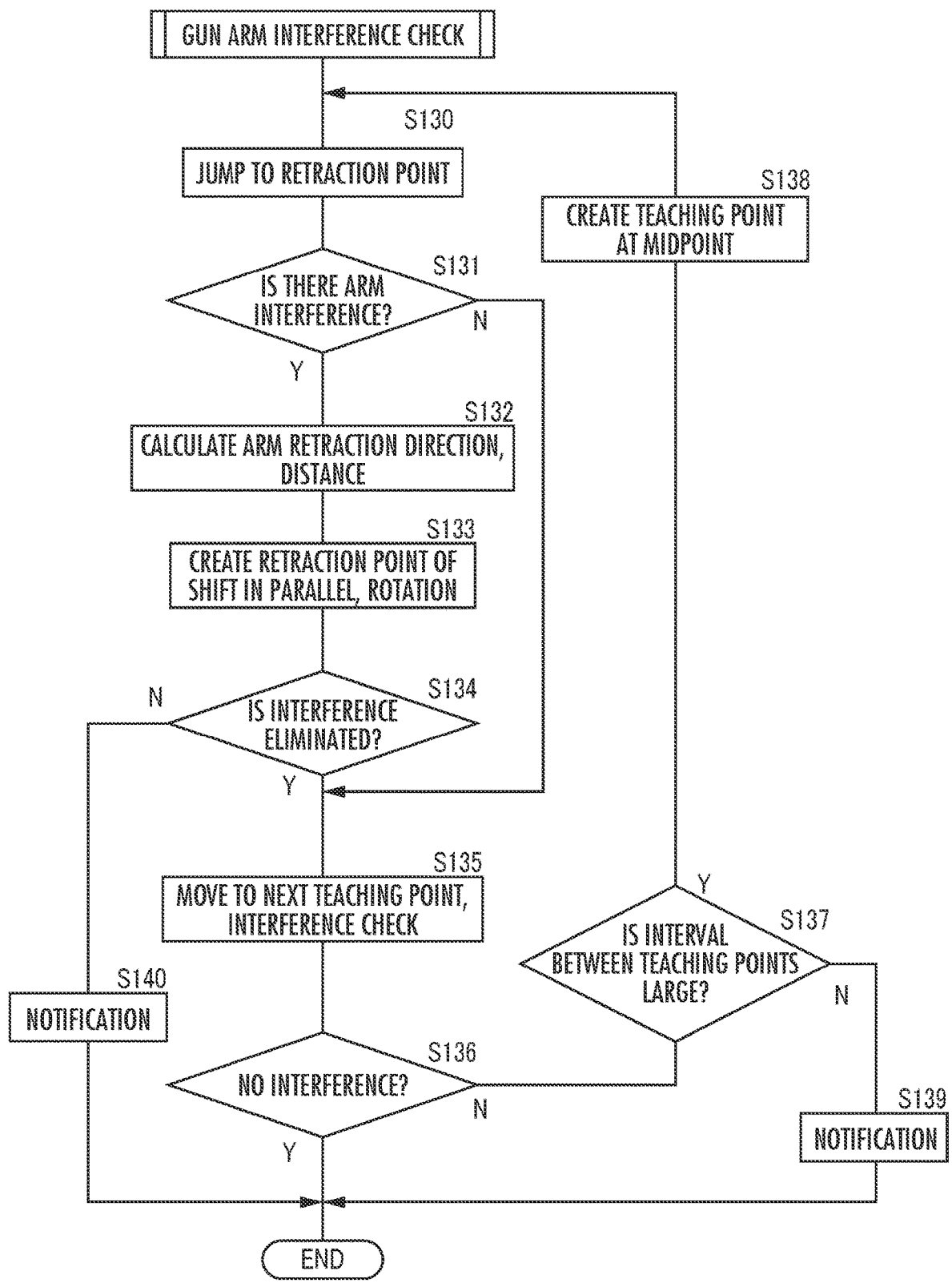
FIG. 9 is a flowchart illustrating a second determination step according to the present embodiment.

FIG. 9 is a flowchart illustrating a "gun arm interference check process" in step S106 of FIG. 6.

First, in step S130, the gun unit 52 is arranged at a teaching point.

Then, the process proceeds to step S131, and it is confirmed whether the arm of the articulated robot 50 interferes with the workpiece 80.

Then, in a case where the articulated robot 50 interferes with the workpiece 80 or another component part, the process proceeds to step S132, and a retraction direction of the articulated robot 50 and its distance are calculated.

Then, the process proceeds to step S133, and causes the articulated robot 50 to shift in parallel or to rotate so as to create a retraction point.

Then, the process proceeds to step S134, and it is determined whether the interference has been eliminated.

In a case where the interference has been eliminated, the process proceeds to step S135, causes the gun unit 52 to move to a next teaching point, and confirms whether neither the gun unit 52 nor the articulated robot 50 interferes with the workpiece 80 or any other equipment in step S136. In a case where no interference occurs, the current process ends as it is.

In a case where the articulated robot 50 does not interfere in step S131, the process proceeds to step S135, and causes the gun unit 52 to move to the next teaching point.

In a case where the interference occurs in step S136, the process branches to step S137, and determines whether the interval between the teaching points is large enough to create a teaching point at a midpoint. Whether it is large enough is determined in accordance with the size, the type, the number of joints, or the like of the gun unit 52 and the articulated robot 50.

In a case where the interval between the teaching points is large enough, the process proceeds to step S138, creates a new teaching point at the midpoint between the teaching points. The process returns to step S130, and arranges the gun unit 52 at the teaching point before the movement.

In step S137, in a case where the interval between the teaching points is not large enough, the process proceeds to step S139, and notifies an operator or the like that it is impossible to create a new teaching point.

In step S134, even when the articulated robot 50 is caused to shift in parallel or rotate, in a case where it is impossible to set an appropriate retraction point, and the interference is not eliminated, the process branches to step S140, and notifies the operator or the like that it is impossible to eliminate the interference.

According to the method for avoiding the interference of the welding equipment and the device for controlling the welding equipment of the present embodiment, the parallel lines are set to be respectively in contact with the outer edges of the workpiece cross-section without traversing the workpiece cross-section. Therefore, the pair of parallel lines that are respectively in contact with the outer edges of the workpiece cross-section and that are located on the extension plane of the workpiece cross-section are created with the workpiece cross-section as a reference, the width between the parallel lines is compared with the maximum separation threshold between the welding electrodes, and whether the maximum separation threshold is larger is determined. In a case where the maximum separation threshold is larger, the direction of the reference parallel line can be determined as the pull-out direction, and efficient pull-out direction determination work for pulling out the welding equipment from the workpiece can be provided.

In addition, the parallel lines are set to be respectively in contact with the outer edges of the workpiece cross-section without traversing the workpiece cross-section, the clearance between the welding electrodes and the workpiece can be more appropriately set than a conventional case where an overlapping part of the grid-shaped solid and the workpiece is used as a work model.

According to the present embodiment, the interference avoidance region is set, the interference avoidance region is divided, and the parallel lines are set for each of the interference avoidance regions that have been divided. Therefore, even in a case where the maximum separation threshold does not become larger than the width between the parallel lines even when the direction of the parallel lines is changed without dividing the interference avoidance region, the interference avoidance region can be divided, the parallel lines can be appropriately set for each of the interference avoidance regions that have been divided, and the welding electrodes can be appropriately retracted from the workpiece.

In addition, in the present embodiment,
in the first determination step of determining whether the maximum separation threshold is larger than the width between the parallel lines, in a case where it is determined that the maximum separation threshold is not larger than the width between the parallel lines, the direction of the parallel lines is changed (rotated), and the process is performed again from the reference parallel line creation step of creating a pair of parallel lines that are respectively in contact with the outer edges of the workpiece cross-section without traversing the workpiece cross-section, in the interference avoidance region that has been divided and that are located on the extension plane of the workpiece cross-section. Therefore, even in the case where it is determined in the first determination step that the maximum separation threshold is not larger than the width between the parallel lines, the direction of the parallel lines is changed, and the process is performed again, so that appropriate parallel lines can be set.

Further, in the present embodiment, there is provided the second determination step (for example, step S106 in FIG. 6 and FIG. 9) of determining whether the outer edge of another part of the welding equipment (for example, the articulated robot 50) excluding the welding electrodes interferes with the workpiece cross-section during the operation of pulling out the welding electrodes from the workpiece cross-section. According to the present embodiment, the outer edge of another part of the welding equipment, such as the articulated robot, excluding the welding electrodes can be prevented from interfering with the workpiece cross-section.

REFERENCE SIGNS LIST

10 Off-line teaching apparatus
12 Robot device

16 Monitor
50 Articulated robot
52 Gun unit
70, 72 Electrode
80 Workpiece

The invention claimed is:

1. A method for avoiding interference of welding equipment, when the welding equipment including an articulated robot having a pair of welding electrodes capable of changing a distance between tip ends thereof is pulled out of a workpiece, for avoiding the interference between the pair of welding electrodes and the workpiece, the method comprising:

with a workpiece cross-section as a reference, the workpiece cross-section being cut along a plane including an electrode straight line and a pull-out straight line, the electrode straight line connecting the tip ends of the pair of the welding electrodes separated from each other, the pull-out straight line intersecting with the electrode straight line and extending in a direction of pulling out the welding equipment from the workpiece, a reference parallel line creation step of creating a pair of parallel lines that are respectively in contact with outer edges of the workpiece cross-section without traversing the workpiece cross-section and that are located on an extension plane of the workpiece cross-section;

a first determination step of comparing a width between the pair of parallel lines that have been created in the reference parallel line creation step with a maximum separation threshold of the welding electrodes, the maximum separation threshold of the welding electrodes being a value obtained by subtracting a minimum clearance necessary when the pair of welding electrodes are pulled out of the workpiece from a maximum distance between the tip ends, and determining whether the maximum separation threshold is larger than the width between the parallel lines;

a pull-out direction determination step of determining a direction of the parallel lines as a pull-out direction, in a case where the maximum separation threshold is larger than the width between the parallel lines in the first determination step; and a control step of controlling the articulated robot to move the pair of welding electrodes in the pull-out direction determined in the pull-out direction determination step to pull the pair of welding electrodes out of the workpiece.

2. The method for avoiding the interference of the welding equipment according to claim 1, wherein a region including an entirety of the workpiece cross-section is set as an interference avoidance region into which an entry of the welding electrodes of the welding equipment while making a pull-out movement is avoided, and in a case where it is determined in the first determination step that the maximum separation threshold is not larger than the width between the parallel lines, the interference avoidance region is divided, the parallel lines that are respectively in contact with the outer edges of the workpiece cross-section are created again in the reference parallel line creation step for each divided interference avoidance region, and then the first determination step is performed again.

3. The method for avoiding the interference of the welding equipment according to claim 1, wherein a region including an entirety of the workpiece cross-section is set as an interference avoidance region into which an entry of the welding electrodes of the welding equipment while making a pull-out movement is avoided, and in a case where it is determined in the first determination step that the maximum separation threshold is not larger than the width between the parallel lines, the direction of the parallel lines is changed, and the process is performed again from the reference parallel line creation step in the interference avoidance region.

4. The method for avoiding the interference of the welding equipment according to claim 1, comprising a second determination step of determining whether an outer edge of another part of the welding equipment excluding the welding electrodes interferes with the workpiece cross-section during an operation of pulling out the welding electrodes from the workpiece cross-section.

5. A device for controlling welding equipment for avoiding interference between a pair of welding electrodes and a workpiece, when the welding equipment including an articulated robot having the pair of welding electrodes capable of changing a distance between tip ends thereof is pulled out of the workpiece, the device comprising:

a control unit comprising at least one processor configured to:

with a workpiece cross-section as a reference, the workpiece cross-section being cut along a plane including an electrode straight line and a pull-out straight line, the electrode straight line connecting the tip ends of the pair of the welding electrodes separated from each other, the pull-out straight line intersecting with the electrode straight line and extending in a direction of pulling out the welding equipment from the workpiece, create a pair of parallel lines that are respectively in contact with outer edges of the workpiece cross-section without traversing the workpiece cross-section and that are located on an extension plane of the workpiece cross-section;

compare a width between the pair of parallel lines that have been created with a maximum separation threshold of the welding electrodes, the maximum separation threshold of the welding electrodes being a value obtained by subtracting a minimum clearance necessary when the pair of welding electrodes are pulled out of the workpiece from a maximum distance between the tip ends, and determine whether the maximum separation threshold is larger than the width between the parallel lines; and determine a direction of the parallel lines as a pull-out direction, in a case where the maximum separation threshold is larger than the width between the parallel lines; and a robot control unit including a processor configured to control the articulated robot to move the pair of welding electrodes in the pull-out direction to pull the pair of welding electrodes out of the workpiece.

6. The device for controlling the welding equipment according to claim 5, wherein a region including an entirety of the workpiece cross-section is set as an interference avoidance region into which an entry of the welding electrodes of the welding equipment while making a pull-out movement is avoided, and the control unit is further configured to, in a case where it is determined that the maximum separation threshold is not larger than the width between the parallel lines, divide the interference avoidance region, again create the parallel lines that are respectively in contact with the outer edges of the workpiece cross-section for each divided interference avoidance region, and then again whether the maximum separation threshold is larger than the width between the parallel lines.

7. The device for controlling the welding equipment according to claim 5, wherein
a region including an entirety of the workpiece cross-section is set as an interference avoidance region into which an entry of the welding electrodes of the welding equipment while making a pull-out movement is avoided, and
the control unit is further configured to, in a case where it is determined that the maximum separation threshold is not larger than the width between the parallel lines, change the direction of the parallel lines, and again create the pair of parallel lines in the interference avoidance region.

8. The device for controlling the welding equipment according to claim 5, wherein the control unit is further configured to:
determine whether an outer edge of another part of the welding equipment excluding the welding electrodes interferes with the workpiece cross-section during an operation of pulling out the welding electrodes from the workpiece cross-section.

* * * * *